United States Patent
Forghani et al.

(10) Patent No.: US 11,243,942 B2
(45) Date of Patent: Feb. 8, 2022

(54) PARALLEL STREAM PROCESSING OF CHANGE DATA CAPTURE

(71) Applicant: Capital One Services, LLC, McLean, VA (US)

(72) Inventors: Behdad Forghani, Allen, TX (US); Aniketh Bothra, McKinney, TX (US); Abhijit Chitnis, Frisco, TX (US); Aditya Relangi, Irving, TX (US)

(73) Assignee: Capital One Services, LLC, McLean, VA (US)

( * ) Notice: Subject to any disclaimer, the term of this patent is extended or adjusted under 35 U.S.C. 154(b) by 185 days.

(21) Appl. No.: 16/782,198

(22) Filed: Feb. 5, 2020

(65) Prior Publication Data

US 2021/0049153 A1    Feb. 18, 2021

Related U.S. Application Data

(63) Continuation of application No. 16/542,488, filed on Aug. 16, 2019, now Pat. No. 10,599,639.

(51) Int. Cl.
G06F 16/23       (2019.01)
G06F 16/27       (2019.01)
G06F 16/2455     (2019.01)

(52) U.S. Cl.
CPC .... *G06F 16/2379* (2019.01); *G06F 16/24568* (2019.01); *G06F 16/27* (2019.01)

(58) Field of Classification Search
CPC . G06F 16/2379; G06F 16/24568; G06F 16/27
See application file for complete search history.

(56) References Cited

U.S. PATENT DOCUMENTS

| | | | |
|---|---|---|---|
| 6,882,993 B1 | 4/2005 | Lawande et al. | |
| 8,032,885 B2 | 10/2011 | Fish | |
| 2006/0004750 A1 | 1/2006 | Huang et al. | |
| 2007/0214168 A1 | 9/2007 | Sandrock Grabsky et al. | |
| 2011/0173619 A1 | 7/2011 | Fish | |
| 2013/0007069 A1* | 1/2013 | Chaliparambil | G06Q 10/10 707/803 |
| 2015/0074062 A1* | 3/2015 | Krein | G06F 16/23 707/689 |

(Continued)

OTHER PUBLICATIONS

Jan. 1, 2019—About change data capture (SQL server). Microsoft.

*Primary Examiner* — James Trujillo
*Assistant Examiner* — J Mitchell Curran
(74) *Attorney, Agent, or Firm* — Banner & Witcoff, Ltd.

(57) ABSTRACT

Methods and systems described herein may include processing a change data capture stream in parallel and optimizing the write operations contained in the change data capture stream such that the write operations may be written to a change table in parallel. Processing the change data capture stream may include decoding the transaction data contained in the change data capture stream in parallel. After the transaction data in the change data capture stream has been decoded, the transaction data may be analyzed to identify write operations that write to the same row. Write operations that write to the same row may be merged into a single write operation. The merging of write operations may be performed until each write operation writes to a different row. The write operations may then be written to the change table in parallel.

20 Claims, 9 Drawing Sheets

(56) References Cited

U.S. PATENT DOCUMENTS

| | | |
|---|---|---|
| 2016/0132543 A1 | 5/2016 | Bester et al. |
| 2016/0171039 A1 | 6/2016 | Eisenreich et al. |
| 2019/0042571 A1* | 2/2019 | Li .......................... G06F 3/061 |
| 2019/0065542 A1* | 2/2019 | Baker .................. G06F 16/273 |
| 2019/0268401 A1* | 8/2019 | Desai .................. H04L 41/0803 |
| 2020/0210481 A1* | 7/2020 | Niebielski ........... G06F 16/2365 |

* cited by examiner

Transaction Stream
314

PARALLEL STREAM PROCESSING OF CHANGE DATA CAPTURE

CROSS-REFERENCE TO RELATED APPLICATIONS

The application is a continuation of U.S. patent application Ser. No. 16/542,488, filed Aug. 16, 2019, and entitled "Parallel Stream Processing of Change Data Capture", and is related to U.S. patent application Ser. No. 16/542,619, filed Aug. 16, 2019, and entitled "Optimization of Database Write Operations by Combining and Parallelizing Operations Based on a Hash Value of Primary Keys," the disclosures of which are hereby incorporated by reference in their entireties.

FIELD OF USE

Aspects of the disclosure relate generally to databases and, more specifically, to change data capture.

BACKGROUND

Change data capture ("CDC") is useful for tracking changes made to a source table using a change table. However, CDC data is typically processed in series and, subsequently, written to the change table in series. This is done to ensure the accuracy of the data written to the change table. CDC systems ensure that the change data is written in the correct order by writing in series. Another issue with writing CDC data to a change table in parallel is row locks. An earlier write operation may lock a row to which a subsequent write operation writes. The subsequent write operation may be delayed until the earlier write operation releases the lock on the row. When events are written in series, there is an overhead network delay between writes to the database for each event that increases in proportion to the number of events and consumes resources to handle the backlog of change data.

Aspects described herein may address these and other problems, and generally improve the quality, efficiency, and speed with which change data is written to change tables.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Methods and systems as described herein may include processing a change data capture stream in parallel and optimizing the write operations contained in the change data capture stream such that the write operations may be written to a change table in parallel. Processing the change data capture stream in parallel may include extracting a first event and a second event from a first encoded transaction and assigning the first event and second event identification information, such as a transaction identifier which may be shared by events that are part of the same transaction and a sequence number that may be used to indicate the ordering of events having a common transaction identifier. The first event and second event may be decoded in parallel and then reassembled using the identification information to construct decoded transactions and events with the same ordering as encoded transactions.

The decoded transactions may be further analyzed to reduce the number of events contained therein. In this regard, the decoded transactions comprise a plurality of events. Each event may include a row operation (i.e. write operation) and an identifier that identifies a row on which row operation is performed. The change data capture system may review the identifier of each event in the plurality of events to determine whether any of the events write to the same row. When the change data capture system identifies two or more events that write to the same row, the change data capture system may combine the two or more events into a single event. The single event may replace the two or more events in the original decoded transaction. The replacement may be a reflection of the latest state of the data up to that point in time for the sequence of events. The reduction process may be repeated until the number of events is reduced to the point where each event writes to a different row. The reduced number of events contained in the first decoded transaction may be written to the change table in parallel and as prepared statements. A prepared statement may be an INSERT, UPDATE, or DELETE statement, and a given row may only appear in one prepared statement. Additionally, transactions can be combined into larger transactions in cases like micro batching, but, a transaction may not be broken up. By using prepared statements (i.e., wherein write operations that write to multiple rows are combined into a single operation), write operations may be written significantly faster than writing multiple rows in parallel using separate statements.

Accordingly, the quality, efficiency, and speed with which change data is written to change tables may be improved. These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for improving the quality, efficiency, and speed with which change data is written to change tables. Change data capture (CDC) data may be decoded in parallel and the events contained in the CDC data may be combined to reduce the number of events contained in the CDC data.

Methods and systems as described herein may include processing a change data capture stream in parallel and optimizing the events contained in the change data capture stream such that the events may be written to a change table in parallel. Processing the change data capture stream in parallel may include extracting a first event and a second event from a first encoded transaction and assigning the first event and second event identification information, such as a transaction identifier and a sequence number. The first event and second event may be decoded in parallel and then reassembled using the identification information to create a first decoded transaction.

The first decoded transaction may be further analyzed to reduce the number of events contained therein. In this regard, the first decoded transaction comprises a plurality of events. Each event may include a write operation and an identifier that identifies the row on which the write operation is performed. The change data capture system may review the identifier of each event in the plurality of events to determine whether any of the events write to the same row. When the change data capture system identifies two or more events that write to the same row, the change data capture system may combine the two or more events into a single event. The single event may replace the two or more events in the first decoded transaction. The reduction process may be repeated until the number of events is reduced to the point where each event writes to a different row. The reduced number of events contained in the first decoded transaction may be written to the change table in parallel. Accordingly, the quality, efficiency, and speed with which change data is written to change tables may be improved.

Figure 1:
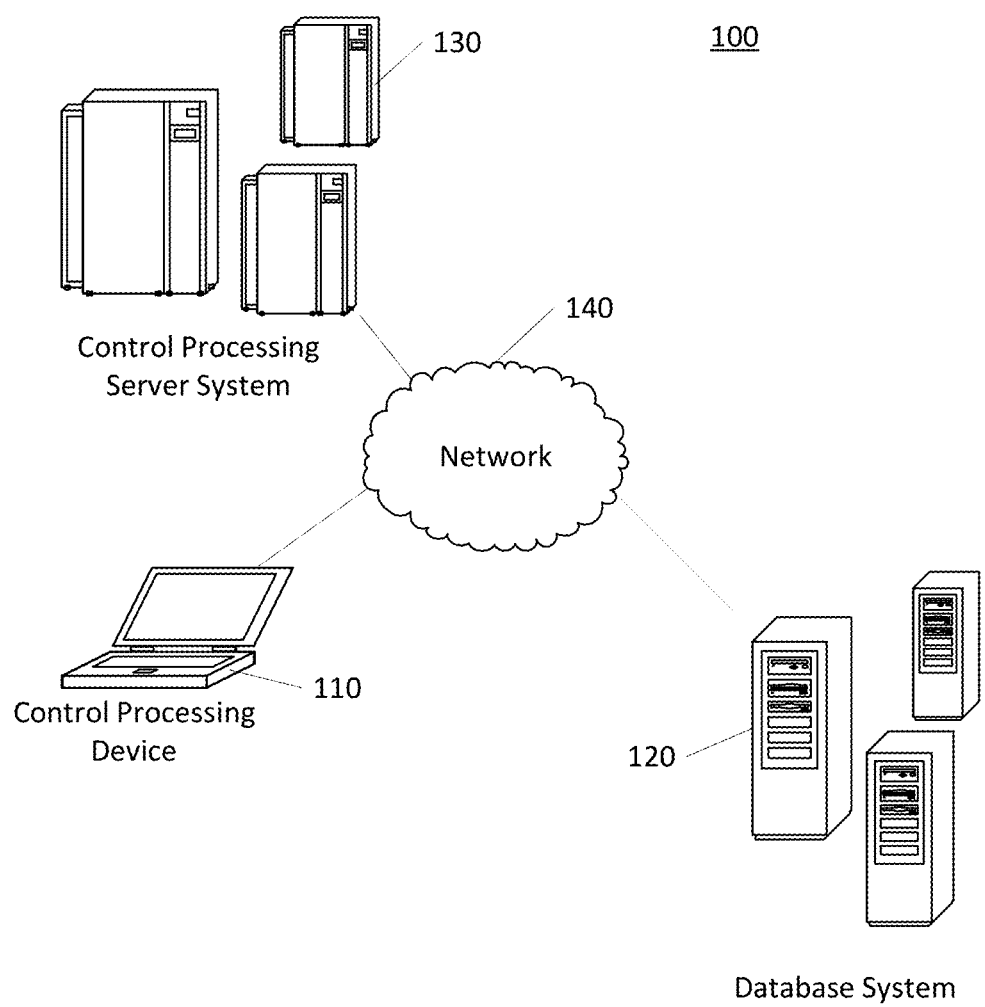
FIG. 1 shows an example of a control processing system in which one or more aspects described herein may be implemented.

FIG. 1 shows a system 100. The system 100 may include at least one client device 110, at least one database system 120, and/or at least one server system 130 in communication via a network 140. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

Client device 110 may access server applications and/or resources using one or more client applications (not shown) as described herein. Client device 110 may be a mobile device, such as a laptop, smart phone, or tablet, or computing devices, such as a desktop computer or a server. Alternatively, client device 110 may include other types of devices, such as game consoles, camera/video recorders, video players (e.g., incorporating DVD, Blu-ray, Red Laser, Optical, and/or streaming technologies), smart TVs, and other network-connected appliances, as applicable.

Database system 120 may be configured to maintain, store, retrieve, and update information for server system 130. Further, database system may provide server system 130 with information periodically or upon request. In this regard, database system 120 may be a distributed database capable of storing, maintaining, and updating large volumes of data across clusters of nodes. Database system 120 may provide a variety of databases including, but not limited to, relational databases, hierarchical databases, distributed databases, in-memory databases, flat file databases, XML databases, NoSQL databases, graph databases, and/or a combination thereof.

Server system 130 may be configured with a server application (not shown) that is capable of interfacing with client application and database system 120 as described herein. In this regard, server system 130 may be a stand-alone server, a corporate server, or a server located in a server farm or cloud-computer environment. According to some examples, server system 130 may be a virtual server hosted on hardware capable of supporting a plurality of virtual servers.

Network 140 may include any type of network. For example, network 140 may include a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies.

The data transferred to and from various computing devices in a system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 100 in front of one or more computing devices such that any external devices may communicate directly with the specialized hardware.

Figure 2:
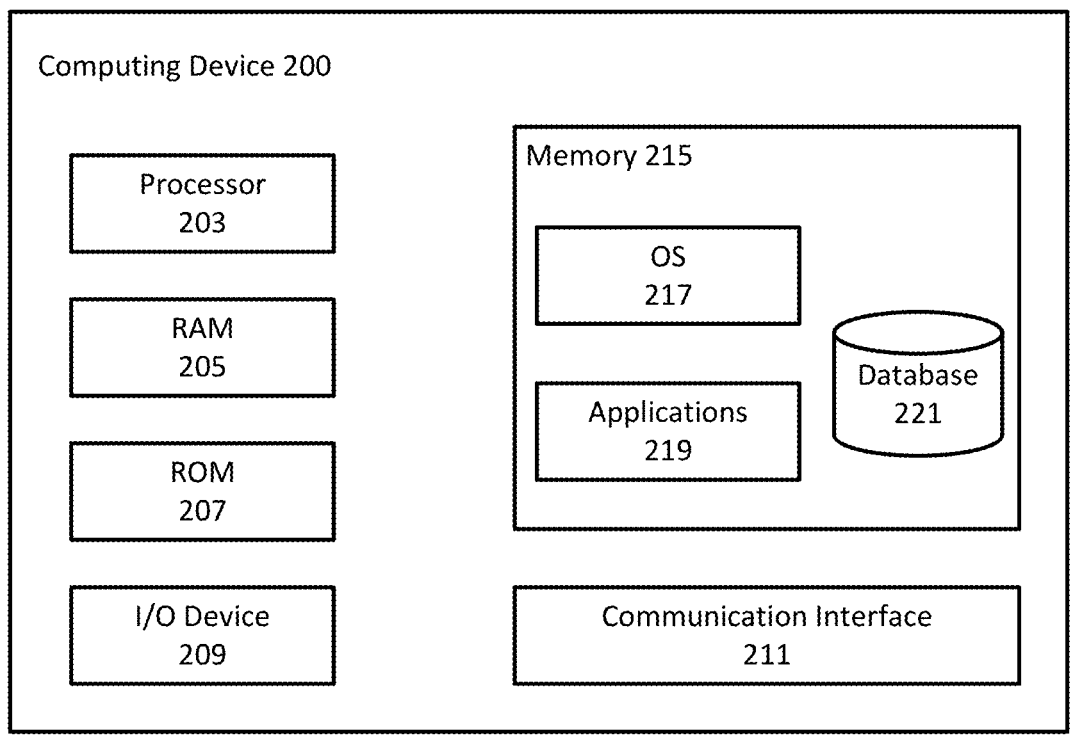
FIG. 2 shows an example computing device in accordance with one or more aspects described herein.

Turning now to FIG. 2, a computing device 200 that may be used with one or more of the computational systems is described. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Figure 3:
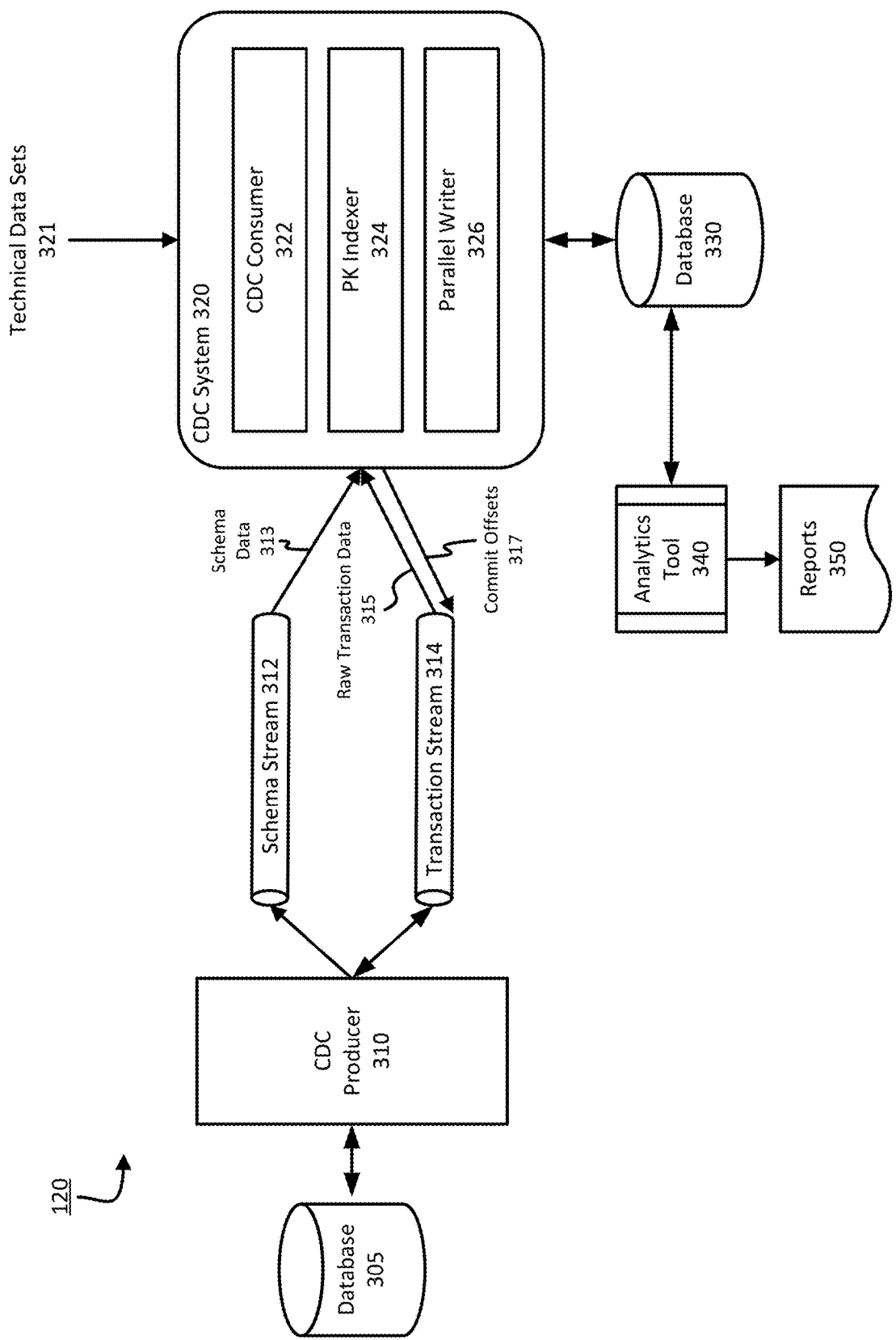
FIG. 3 shows an example of a change data capture (CDC) system according to one or more aspects of the disclosure.

As noted above, database system 120 may be a distributed database capable of storing, maintaining, and updating large volumes of data across clusters of nodes. In order to realize this functionality, database system 120 may need to propagate changes made to a first database to a second database to update the content contained therein. Additionally, changes to the first database may be recorded using a change data capture (CDC) system. FIG. 3 illustrates an example of a CDC system for recording changes to the first database according to one or more aspects of the disclosure.

Turning to FIG. 3, database system 120 may include a first database 305 communicatively coupled to CDC system 320 via CDC producer 310. CDC system 320 may be communicatively coupled to second database 330.

First database 305 may be a database in a distributed database system, such as database 120. As noted above, first database 305 may be a relational database, hierarchical database, in-memory database, flat file database, XML database, NoSQL database, graph database, or any combination thereof. First database 305 may be communicatively coupled to a server (not shown) that reads and writes data and information to first database 305. Alternatively, or additionally, first database 305 may be communicatively coupled to one or more client devices (not shown) that read or write data and information to first database 305.

CDC producer 310 may be hardware, software, firmware, or any combination thereof that is configured to enable the replication of data in heterogeneous data environments. CDC producer 310 may be integral to first database 305.

Alternatively, CDC producer 310 may be a standalone device that is communicatively coupled to first database 305, CDC system 320, and second database 330. In operation, CDC producer 310 may be configured to monitor first database 305 for any changes, updates, or other modifications made to the data and information contained in first database 305. Alternatively, transaction stream 314 may be pushed to CDC producer 310 from first database 305. In some embodiments, first database 305 may submit changes, updates, or other modifications made to tables (i.e., source tables) contained in first database 305 to a log file (not shown). CDC producer 310 may access the log file to retrieve the changes, updates, or other modifications made to first database 305. In other embodiments, CDC producer 310 may be configured to migrate the data and information to other devices in a network, such as a server or second database 330. When CDC producer 310 detects changes, updates, or modifications to first database 305, the changes, updates, or modifications may be conveyed to CDC system 320 in two streams: schema stream 312 and transaction stream 314. In some embodiments schema stream 312 and transaction stream 314 may be combined into a single stream. CDC system 320 may process schema stream 312 and transaction stream 314 and store the change data in one or more change tables of second database 330. In this regard, a change table may correspond to a source table. Furthermore, a change table may mirror the column structure of its corresponding source table and may capture the changes, updates, or other modifications made to the rows of the corresponding source table to provide users with access to change data. By mirroring the source table, which is accessed and updated by enterprise applications, the change table may be able to reduce the load on the first database that would be caused by analytic and business intelligence applications running on the source table.

Schema stream 312 may define the data structures contained in transaction stream 314. The schema may be a serialization technique used to translate the data structures, objects, and/or states of data and information contained in first database 305 into a format that may be propagated to other systems, such as a server or other databases in a distributed database system. Schema stream 312 may include schema data 313, such as one or more identifier bindings used to identify one or more fields in transaction stream 314.

Transaction stream 314 may include raw transaction data 315. Raw transaction data 315 may include transaction data that has been encoded according to the schema data 313. In some examples, raw transaction data 315 may include change data capture data. Change data capture data may comprise additions, updates, changes, and/or deletions made to first database 305. Transaction stream 314 may be referred to herein as a change data capture (CDC) stream. As noted above, raw transaction data 315 may be serialized database information. For example, objects from first database 305 may be converted into a stream of bytes, such as transaction stream 314, in order to transmit the objects over a network. Transaction stream 314 is discussed in greater detail below, with respect to FIG. 4.

CDC system 320 may receive schema stream 312 and transaction stream 314 and store the CDC data in a data warehouse, such as change tables of database 330. In some embodiments, CDC system 320 may propagate the change data capture information contained in transaction stream 314 to other databases in database system 130. In addition to receiving schema stream 312 and transaction stream 314, CDC system 320 may receive technical data set 321 from an external source, such as an administrator or a management server. Technical data set 321 may define one or more columns in database system 120. Additionally, or alternatively, technical data set 321 may define metadata for the data and information maintained in database system 120. In some embodiments, the schema stream may not support certain datatypes, such as timestamps. The CDC producer 310 may convert the transaction stream to text, and the metadata provided by technical data set 321 may help recover the correct datatype, for example, when a conversion occurs such that the data in transaction stream 314 is converted from the datatype specified by the CDC schema to the datatype specified in technical dataset. CDC system 320 may be hardware, software, firmware, or any combination thereof. CDC system 320 may be a standalone system, such as a server, located in database system 120. Alternatively, or additionally, CDC system 320 may be a component integral to database system 120. In some embodiments, CDC system 320 may be an integral part of each of the databases located in database system 120. CDC system 320 may comprise CDC consumer 322, primary key (PK) indexer 324, and parallel writer 326.

CDC consumer 322 may be hardware, software, firmware, or any combination thereof that is configured to read and decode a plurality of transactions contained in transaction stream 314. Additionally, CDC consumer 322 may be configured to assign an event number to each of the plurality of events contained in a transaction. Event numbers may be assigned sequentially based on the order in which the events appear in the transaction. In some embodiments, CDC consumer 322 may have a plurality of decoders to decode a plurality of events contained in each transaction in parallel. For example, CDC consumer 322 may use schema data 313 contained in schema stream 312 to parse transaction stream 314. Parsing transaction stream 314 may include deserializing the plurality of transactions contained in transaction stream 314. Deserializing the plurality of transactions may include using one or more identifier bindings to locate the plurality of transactions and the fields contained therein. As will be discussed in greater detail below with respect to FIG. 5, decoding the plurality of transactions contained in transaction stream 314 may be performed in parallel using a plurality of decoders.

PK indexer 324 may be hardware, software, firmware, or any combination thereof configured to analyze a plurality of events in a first transaction and determine whether a first event and a second event may be combined into a single event. As will be discussed in greater detail below with respect to FIG. 7, PK indexer 324 may evaluate the plurality of events to determine events that operate on the same row of the same table in the same database. In order to render its determination, PK indexer 324 may employ a hash table, or a nested hash table, that allows queries to be performed that identify the database, table, and row that an event may execute on. As will be discussed in greater detail below, one or more hash identifiers from an event may be used to query the hash table to determine whether another event, already present in the hash table, writes to the same row as the event. When PK indexer 324 locates two or more events that write to the same row of the same table in the same database, PK indexer 324 may combine the two or more events into a single event. PK indexer 324 may repeat this evaluation until each event in the first transaction or combined transactions writes to a different row. In this way, PK indexer 324 may reduce the number of events, or operations, performed in the first transaction. Additionally, because each of the events in the reduced number of events writes to a different row, the plurality of events may be written to the change tables of second database 330 in parallel and row locks may be avoided.

The reduced the number of events in the first transaction may be transmitted to parallel writer 326. Parallel writer 326 may be hardware, software, firmware, or any combination thereof that is configured to receive the reduced number of events from PK indexer 324, sort the reduced number of events, and write the reduced number of events to second database 330 in parallel. Parallel writer 326 may combine all the rows for the same table and same event type into a single prepared statement. Prepared statements may appear similar to regular statements (i.e. database operations), but, use placeholders for the columns and a large number of rows may be passed as a parameter. Prepared statements greatly improve the performance since prepared statements behave similarly to a single statement in regards to parsing and wire protocol handshake. For example, all delete operations that have the same number of primary key columns as there are primary key columns in the table may be combined into a single prepared statement. In another example, insert operations that have the same number of columns as the table, the insert operations may be combined into a single prepared statement. Using prepared statements in this way represents a more efficient technique than performing separate delete or insert operations per row.

The reduced number of events may be sorted by table, operation, or any combination thereof. After the reduced number of events are sorted, the reduced number of events may be written to second database 330 in a single commit transaction. Once the reduced number of events are written, parallel writer 326 may issue commit offsets 317 to first database. Commit offsets 317 may signal to first database 305 that the changes, updates, or other modifications made by the first transaction have been recorded in second database 330. In this regard, second database 330 may contain change tables that mirror the source tables of first database 305. The change tables may provide a non-production environment to obtain metrics regarding a state of the data in first database 305. For example, the change tables (i.e. the second database) may be configured to receive one or more real-time queries to reduce the load on the first database.

In some embodiments, database system 120 may include analytics tool 340 that may be used to generate one or more reports 350. In this regard, analytics tool 340 may issue one or more queries to CDC system 320, second database 330, or both to aggregate one or more metrics to generate the one or more reports 350. The metrics may be business intelligence (BI) metrics and will generally be the same as if the BI metrics were derived from first database 305. The advantage of creating the metrics from second database 330 is that first database 305 may be isolated from the load of generating BI metrics since CDC puts less of a load on first database 305 than running BI applications. Additionally, obtaining metrics from second database 330 may allow for use of a technology that is more suitable for BI applications, such as in memory database, that may not be suitable for the application that connects to first database 305. The queries may be generated automatically by analytics tool 340, issued by a system administrator, or any combination thereof. Additionally, the queries may change, based on context, to drill down on certain metrics. One or more reports 350 may be presented to a user, such as a database administrator, to evaluate the performance of database system 120, first database 305, second database 330, CDC system 320, or any combination thereof.

Figure 4:
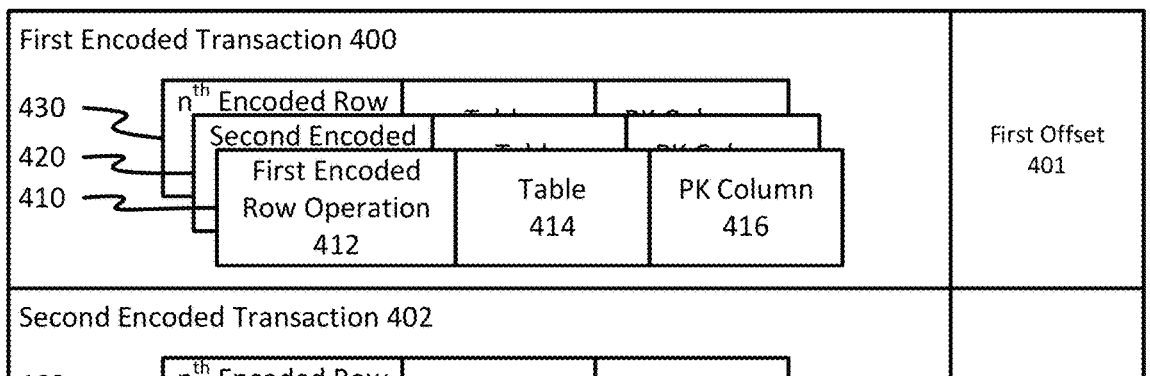
FIG. 4 shows an example of a transaction stream in accordance with one or more aspects described herein.
Figure 4:
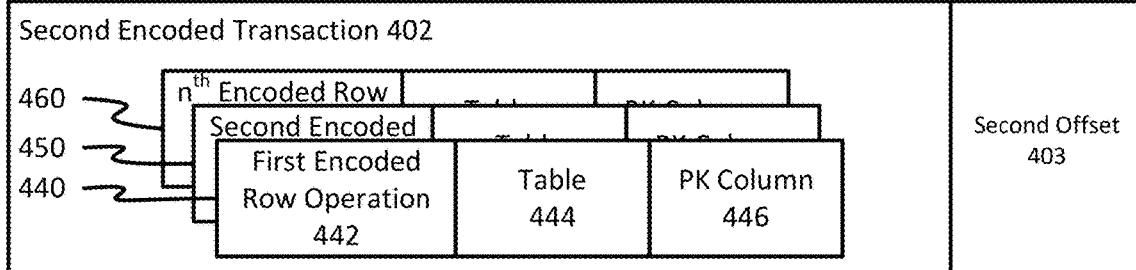
Figure 4:
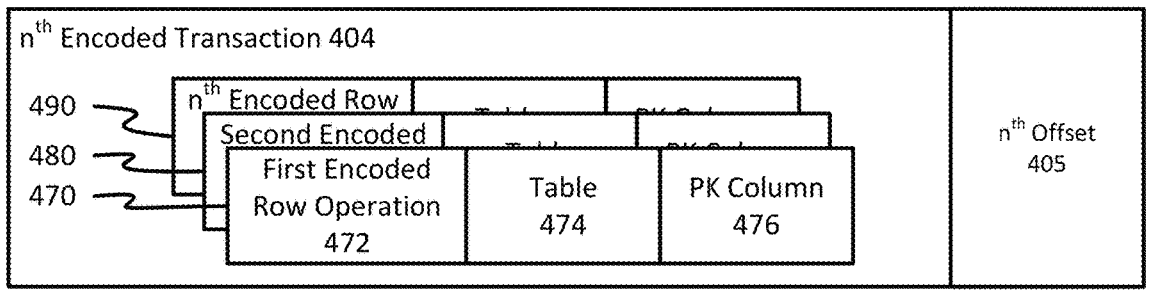

As discussed above, transaction stream 314 may be received by CDC system 320 as an encoded stream of data. FIG. 4 shows an example of the encoded stream of data in accordance with one or more aspects of the disclosure.

FIG. 4 illustrates an example of transaction stream 314. Transaction stream 314 may comprise a first encoded transaction 400, a second encoded transaction 402, and an $n^{th}$ encoded transaction 404. While only three transactions are shown in FIG. 4, transaction stream 314 may include more or fewer transactions.

First transaction 340 may comprise a first event 410, a second event 420, and a third event 430. While first transaction 340 only illustrates three events, first transaction 400 may include more or fewer events. Each of the transactions shown in FIG. 4 is associated with an offset value and includes a plurality of events. For example, first encoded transaction 400 may include first offset value 401, as well as a first event 410, a second event 420, and an $n^{th}$ event 430. Offset value 401 may be used to identify a plurality of events that may be grouped together as a transaction. Further, first encoded transaction 400 may only illustrate three events, however, it will be appreciated that first encoded transaction 400 may include more or fewer events. It is also important to note that the first offset value 401 will be the same for each event in the first encoded transaction. Second offset value 403 and nth offset value 405 may be sequentially numbered for each transaction. The events of a second transaction may be assigned their own set of sequentially numbered event numbers.

Turning to an example of the events, first event 410 may include a plurality of fields. For instance, first event 410 may include a first encoded row operation 412, a database field (not shown), a table field 414, a set of primary key column fields 416, a non-primary key column fields (not shown). First encoded row operation 412 may include a database command and, in preferred embodiments, a write command, such as an insert row operation, an update row operation, and a delete row operation. The insert row operation may create a new row in a table of the database, the update row operation may modify an existing row in a table of the database, and the delete row operation may delete a row in a table of the database. Database field may identify the database on which first encoded row operation 412 is performed; table field 414 may identify the table, in the database, on which first encoded row operation 412 is performed. Primary key columns 416 may include a first set of values that uniquely identifies a row on which to perform first encoded row operation 412. CDC consumer 322 may calculate a hash value from the values in the first set of primary key columns. As noted above, the hash value may allow for an efficient and unique technique for identifying rows using the hash table. In this regard, rows with the same values in the first set of primary key columns will generate the same hash value. Accordingly, performing hash table look-ups using hash values derived from the values in the first set of primary key columns represents a more efficient approach to identifying events that execute on the same row. Non-primary key column may identify additional columns in a row and the data that may be written to those additional columns in the row identified by primary key column 416.

Figure 5:
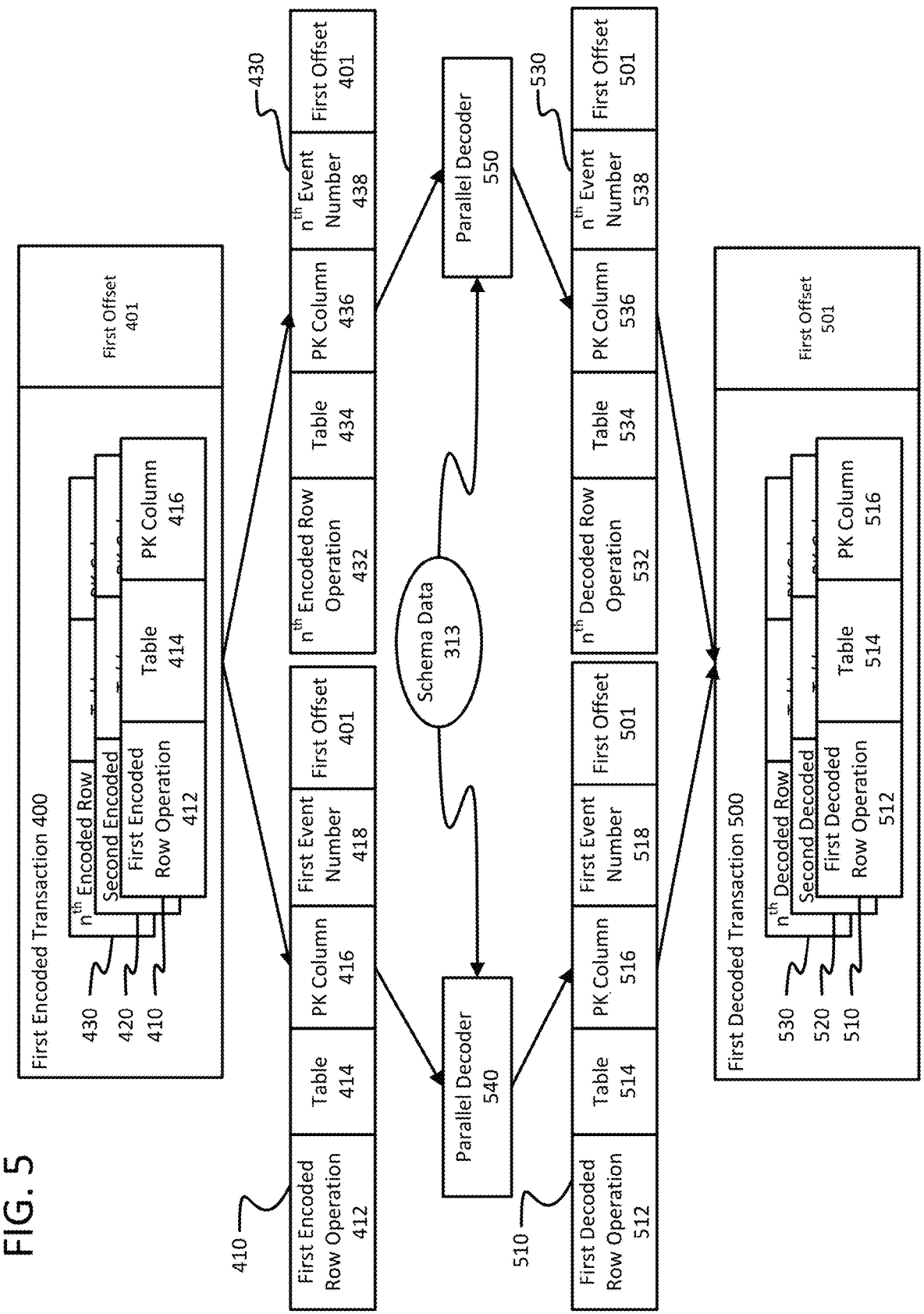
FIG. 5 shows an example of decoding first encoded transaction according to one or more aspects of the disclosure.

As noted above, it may be useful to encode transaction stream 314 according to the schema stream 312 for transmission purposes. However, transaction stream 314 may need to be decoded before the data contained therein may be used to update second database 330. FIG. 5 shows an example of decoding first encoded transaction 400 according to one or more aspects described herein.

CDC consumer 322 may receive a transaction stream from a first database that includes a plurality of encoded transactions, including first encoded first transaction 400. As noted above, first transaction may comprise a first offset value 401 and a plurality of encoded events (i.e. first encoded event 410, second encoded event 420, $n^{th}$ encoded event 430). The plurality of encoded events may include encoded row operations, such as first encoded row operation 412 and $n^{th}$ encoded row operation 432. CDC consumer 322 may divide the first encoded transaction by events. Accordingly, first encoded event 410 may be separated from the remainder of first encoded transaction 400. First encoded event 410 may be associated with first event number 418 and first offset value 401. Associating first encoded event 410 with first event number 418 and first offset value 401 may include tagging the first event with first event number 418 and first offset value 401. Similarly, second encoded event 420 and $n^{th}$ encoded event 430 may be associated with its event number and first offset value 401. For example, $n^{th}$ encoded event 430 may be tagged with $n^{th}$ event number 438 and first offset value 401. Each of the individualized encoded events may be processed using a parallel decoder to produce a decoded event. For example, parallel decoder 540 may receive schema data 313 to process first encoded event 410. Processing first encoded event 410 may comprise using schema data 313 to parse first encoded row operation 412 to produce first decoded row operation 512. Other fields in the first event may be processed by parallel decoder 540. Additionally, parallel decoder 550 may analyze the $n^{th}$ event 430 in a similar manner.

Parallel decoder 540 may produce a first decoded event 510 that includes first decoded row operation 512, a database field (not shown), a table field 514, a primary key column field 516, a non-primary key column field (not shown), an event number 518, and first offset value 501. In operation, table field 514, primary key column field 516, non-primary key column field (not shown), event number 518, and first offset value 501 may have the same values as table field 414, primary key column field 416, non-primary key column field (not shown), event number 418, and first offset value 401.

Parallel decoder 550 may produce $n^{th}$ decoded event 530 that includes $n^{th}$ decoded row operation 532, a database field (not shown), a table field 534, a primary key column field 536, a non-primary key column field (not shown), an event number 538, and first offset value 501. As noted above, database field (not shown), table field 534, primary key column field 536, non-primary key column field (not shown), event number 538, and first offset value 501 may have the same values as their corresponding fields in the encoded event. CDC consumer 322 may use the event number and offset value to reassemble first decoded transaction 500. That is, events with the same offset value may be grouped in the same transaction and the event number associated with each event may be used to arrange the events in a correct sequence in first decoded transaction 500. For example, first decoded event 510, second decoded event 520, $n^{th}$ decoded event 530 may be grouped in first decoded transaction for being associated with first offset value 501. Similarly, first event number 518 may indicate that first decoded event occurs first sequentially, second event number 528 may indicate that second decoded occurs next, and so on and so forth.

In this regard, associating each event with its respective event number and offset value may allow the events to be decoded in parallel and then reassembled in the proper order to produce first decoded transaction 500. The ability to decode a transaction in parallel represents a significant reduction in the time and processing overhead typically used to decode transactions in series. Thus, decoding database transactions in parallel allows for a reduced consumption of processing resources and network bandwidth resources not realized by prior art systems that decode database transactions in series.

Figure 6:
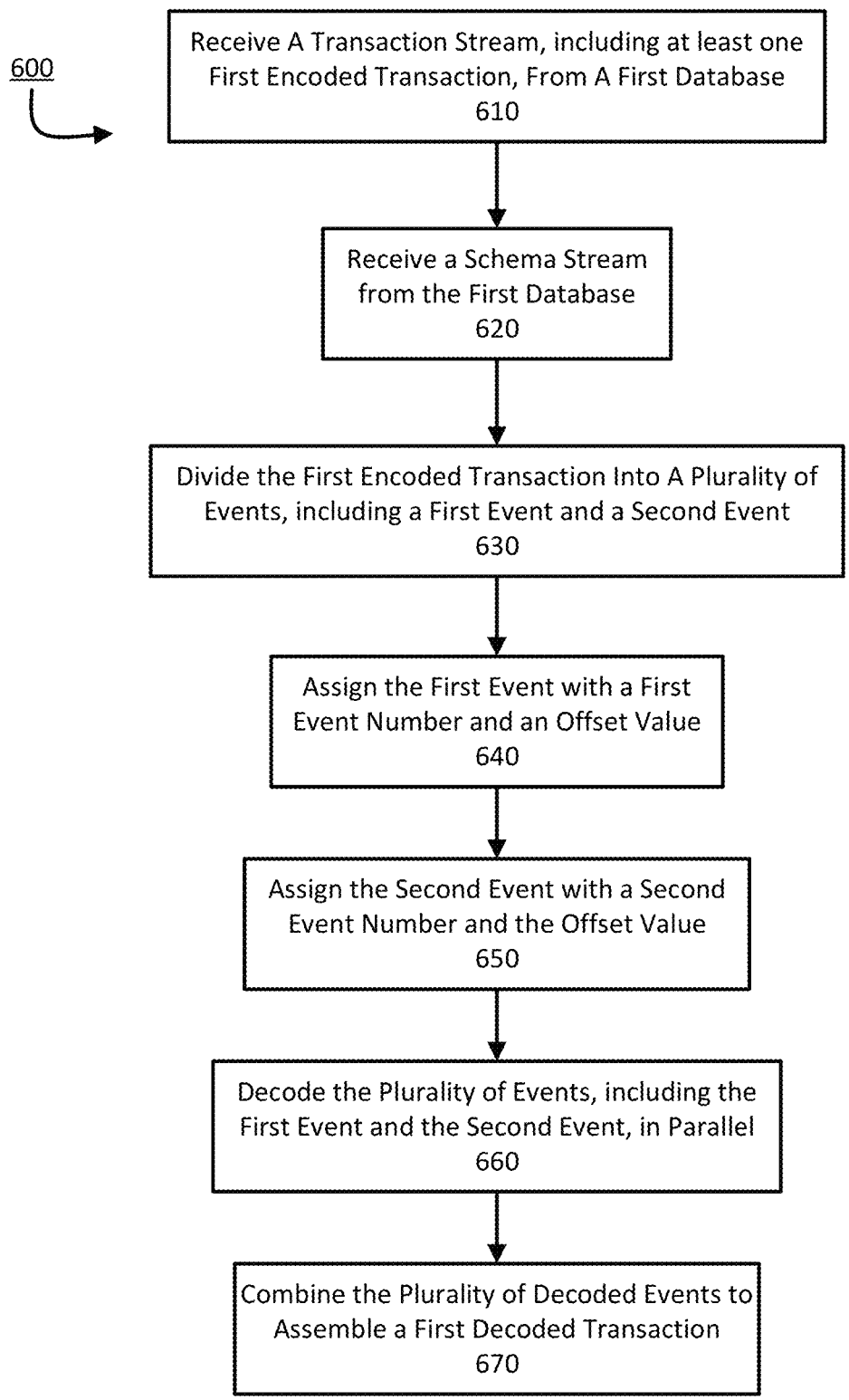
FIG. 6 shows a flowchart for decoding an encoded transaction in parallel according to one or more aspects of the disclosure.

Turning to FIG. 6, a flowchart of a process 600 for decoding an encoded transaction in parallel according to one or more aspects of the disclosure is shown. Some or all of the steps of process 600 may be performed using one or more computing devices as described herein.

Process 600 begins in block 610, with CDC system 320 receiving a transaction stream from a first database. As noted above, the transaction stream may include at least one first encoded transaction. Further, the transaction stream may be received by the CDC consumer 322. In block 620, a schema stream may be received from the first database. The schema stream may be received concurrently with the transaction stream. Alternatively, the schema stream may be after the transaction stream.

In block 630, the first encoded transaction may be divided into a plurality of encoded events, including a first encoded event and a second encoded event. Dividing the first encoded transaction into a plurality of encoded events may be based on the received schema stream. In block 640, the first encoded event may be assigned a first event number and the offset value associated with the first encoded transaction. As discussed above, this may involve the CDC consumer 322 tagging the first encoded event with the first event number and the offset value. The first event number assigned to the first event may be zero ("0"). Similarly, in block 650, the second encoded event may be assigned a second event number and the offset value. Following the numbering convention set forth above, the second event may be assigned event number one ("1"). While process 600 describes associating a first encoded event and a second encoded event with a first event number and second event number, respectively, it will be appreciated that blocks 640 and 650 may be repeated for each encoded event in the first encoded transaction. Accordingly, each event in the first encoded transaction may be assigned an event number and the offset value of the first encoded transaction.

In block 660, the plurality of events may be decoded in parallel. As discussed above, a plurality of decoders may operate in parallel to decode the plurality of events contained in the first transaction. The plurality of decoders may use the schema stream to decode the plurality of events. After the plurality of events have been decoded, the plurality of decoded events may be combines to reassemble a first decoded transaction in block 670. In this regard, the offset value may be used to identify events that belong to the first decoded transaction. Once the decoded events are grouped by the offset value, the plurality of decoded events may be arranged in sequential order using their respective event number.

Figure 7:
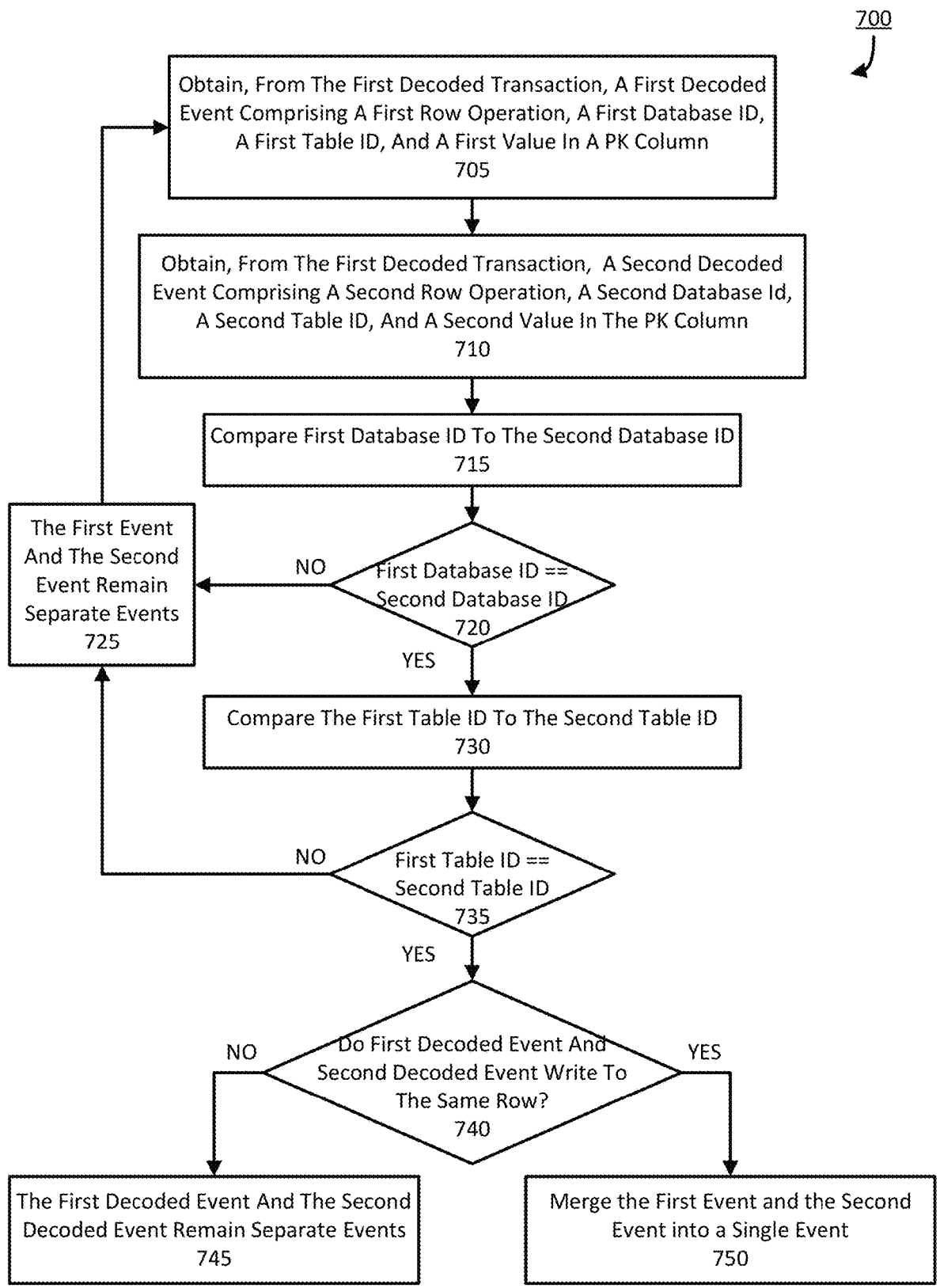
FIG. 7 shows a flow chart of a process for determining whether a first event and a second event may be combined into a single event to reduce the number of events in a transaction according to one or more aspects of the disclosure.

While decoding events in parallel represents an improvement, typical database systems may write the decoded events in series, creating a bottleneck in propagating updates to the database. Writing in parallel may cause events to be written to the database out-of-order, which could result in the wrong information being committed to the database. Accordingly, there is a need for a solution that allows events to be written to a database in parallel. One solution may be to combine events that write to the same row into a single event. This may be repeated for each event in a transaction such that every event in a transaction writes to a different row. This would avoid row locks and allow the transaction to be written to the database in parallel. FIG. 7 shows a flow chart of a process 700 for determining whether a first event and a second event may be combined into a single event to reduce the number of events, and, consequently, the number of write operations, in a transaction according to one or more aspects of the disclosure. Some or all of the steps of process 700 may be performed using one or more computing devices as described herein.

In block 705, a first row operation, a first database identifier, a first table identifier, and a first primary key value in a primary key column may be obtained from the first decoded event. The first decoded event may be analyzed or parsed using a schema to locate the first row operation, the database field, the table field, and the primary key column field. After locating each of the fields, the first row operation, the first database identifier, the first table identifier, and the first primary key value may be extracted from the first decoded event. In some embodiments, a first hash value may be generated for the first database identifier and a second hash value may be generated for the first table identifier. As noted above, the first hash value and second hash value may be used to query a hash table to locate the database and table the first decoded event may write to. A second row operation, a second database identifier, a second table identifier, and a second primary key value may be obtained from the second decoded event in a similar manner, in block 710. As with the first decoded event, a fourth hash value may be generated for the second database identifier and a fifth hash value may be generated for the second table identifier. The fourth hash value and fifth hash value may be used to query the hash table to locate the database and table the second decoded event may write to.

In block 720, the first database identifier and the second database identifier may be compared. In some embodiments, comparing the first database identifier and the second database identifier may comprise running two queries on the hash table. The first query may be performed using the first hash value, and the second query may be performed using the second hash value. In block 725, a determination may be made as to whether the first database identifier is equal to the second database identifier. That is, a determination may be made as to whether the first decoded event and the second decoded event operate on the same database. When the first database identifier and the second database identifier are different, process 700 proceeds to block 725, where the first decoded event and the second decoded event remain separate events. Additionally, process 700 may return to block 705 to determine whether additional events may be combined. In some embodiments, process 700 may iterate through each of the events in the first decoded transaction to determine whether any of the events write to the same row of the same table in the same database.

When the first database identifier and the second database identifier match, the first table identifier and the second table identifier may be compared in block 730. Similar to the comparison performed on the database identifiers, comparing the first table identifier and the second table identifier may comprise running two queries on the hash table. The first query may be performed using the second hash value, and the second query may be performed using the fifth hash value. In block 735, a determination may be made as to whether the first table identifier is equal to the second table identifier. In other words, a determination may be made as to whether the first decoded event and the second decoded event write to the same table. When the first table identifier and the second table identifier are different, process 700 proceeds to block 725, and the first decoded event and the second decoded event remain separate write operations. As noted above, process 700 may proceed to analyze all of the decoded events in the first decoded transaction to determine whether any of the events can be combined. In some embodiments, the database identifiers and table identifiers may be used to group events that write to the same database and table.

After grouping events that write to the same database and table, process 700 may proceed to block 740, where a determination may be made whether the first event and the second event write to the same row. A third hash value may be generated from the one or more first primary key values located in the one or more primary key columns of the first event. Accordingly, the first event may be stored in a hash table. Similarly, a sixth hash value may be determined from one or more second primary key values associated with the one or more primary key columns of the second event. The sixth hash value may be used to query the hash table to determine whether the second write operation writes to the same row as any other operation in the hash table. For example, the query may compare the sixth hash value to one or more hash values contained in the hash table, including the third hash value. When the sixth hash value and the third hash value are not equal, a determination may be made, in block 740, that the first write operation and the second write operation write to different rows. Accordingly, in block 745, the first decoded event and the second decoded event remain separate events. In some embodiments, the first event and the second event may be entered in the hash table as separate entries. However, when the query indicates that the first write operation and second write operation write to the same row, a determination may be made that the first decoded event and the second decoded event may be merged into a single event in block 750. In this regard, one or more hash values may be generated for each subsequent event. The one or more hash values may be used to query the hash table to determine if the one or more hash values matches any of the entries in the hash table. When the one or more hash value matches an entry in the hash table, the events may be combined. When the hash value for the subsequent event does not appear in the hash table, the subsequent event may be added as a row to the hash table. In this regard, using hash tables may represent a more efficient technique for determining whether events write to the same row.

In an alternative embodiment, the determination of whether the first event and the second event write to the same row may be made by comparing the first primary key value to the second primary key value. If the first primary key value is equal to the second primary key value, a determination may be made that the first event and the second event write to the same row. Accordingly, the first event and the second event may be combined into a single event. When the first primary key value and the second primary key value are not equal, an indication may be provided that the first event and the second event write to different rows. Therefore, the first event and the second event may remain separate events. While this approach may be less efficient than using hash tables, it is simpler to implement.

Figure 8:
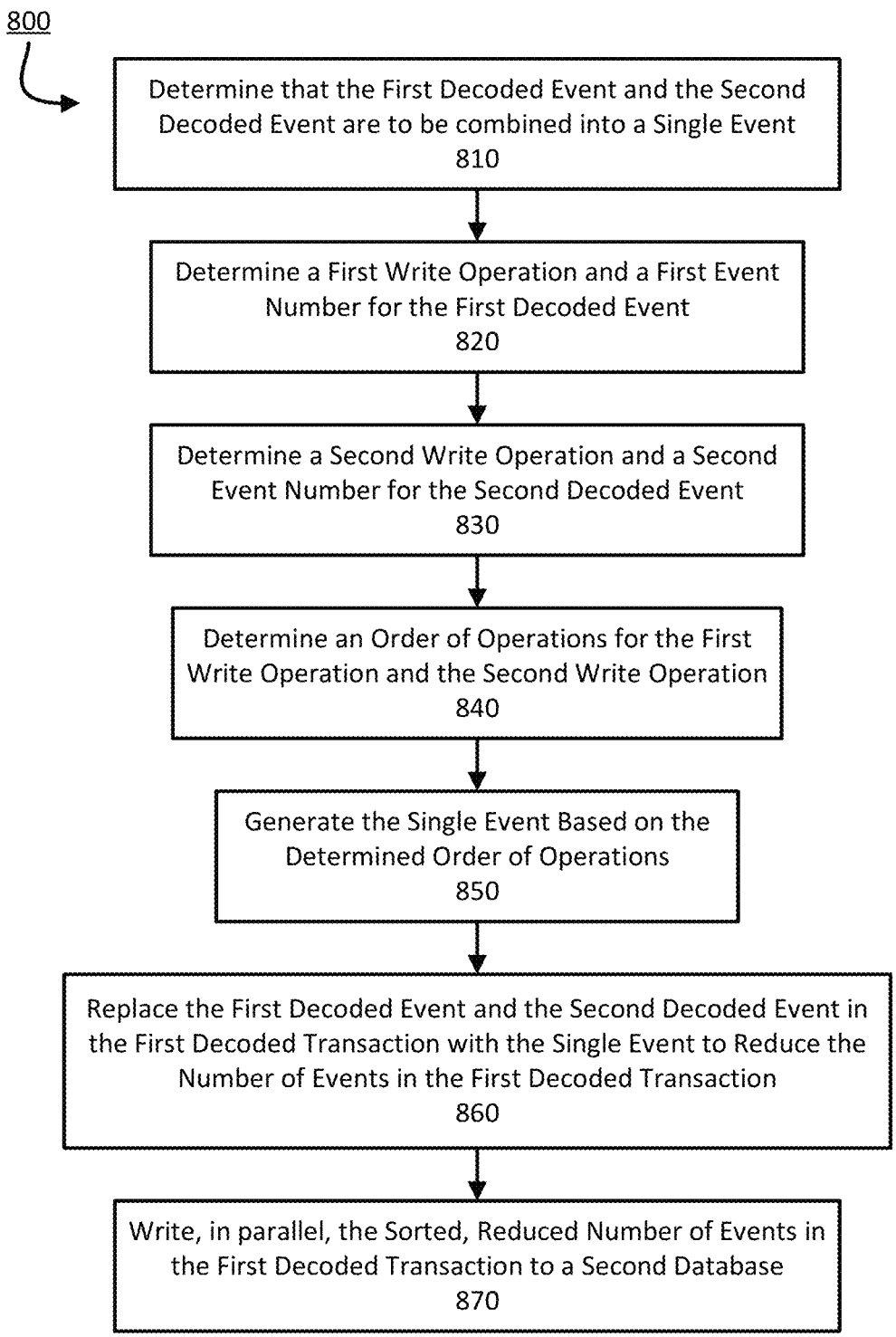
FIG. 8 shows a flow chart of a process for determining how to merge the first event and the second event into a single, third event and writing, in parallel, the reduced the number of events to the database according to one or more aspects of the disclosure.

Once a determination is made that the first decoded event and second decoded event may be combined, the first decoded event and second decoded event may be analyzed to determine the proper order of operations so the correct data may be written to the database. FIG. 8 shows a flow chart of a process 800 for determining how to merge the first decoded event and second decoded event into a single event and writing, in parallel, the reduced number of events in the first decoded transaction to the database according to one or more aspects of the disclosure.

In block 810, a determination may be made that the first decoded event and second decoded event may be combined into a single event. In block 820, a first write operation and a first event number may be determined from the first decoded event. Similarly, a second write operation and a second event number may be determined from the second decoded event in block 830.

After determining the first write operation, the first event number, the second write operation and the second write operation, an order of operations may be determined for the first write operation and the second write operation in block 840. The order of operations may be determined on a number of factors. For example, the order of operations may be based on the type of write operation (i.e., insert row, update row, delete row) being performed. Additionally, or alternatively, the order of operations may be based on the sequential order of the first event number and the second event number. In some embodiments, both the type of operation and the sequential order of the event numbers may be used to determine the order of operations.

In block 850, a single event comprising a third write operation may be generated from the first write operation and the second write operation based on the order of operations. In this regard, the type of write operation being performed for the first write operation and the second write operation, as well as the sequence of event numbers, may determine the type of write operation generated for the third write operation. For example, when the first write operation is a first insert row operation and the second write operation is an update row operation following the first write operation, the third write operation may be a second insert row operation. The second insert row operation may be similar to the first row operation, only differing by having the data and information from the update row operation overwrite the columns in the first insert row operation. Accordingly, the third write operation may have the same database identifier, the same table identifier, and the same value (or values) in the primary key column(s) as the first write operation and the second write operation; however, the third write operation may have the updated values from the second write operation in non-primary key columns, where applicable. Accordingly, the third write operation may be functionally equivalent to the combination of the first write operation and the second write operation. In another example, the first write operation is a first update row operation and the second write operation is a second update row operation, the generated third write operation may be a third update row operation. The third write operation may be similar to the first update operation, but with the updated fields from the second update row operation. Additionally, the third write operation may include additional columns that may have been included in the second update row operation. In still yet another example, when the first write operation is an insert row operation and the second write operation is a delete row operation that follows the first write operation, both the first write operation and the second write operation may be removed from the first decoded transaction. In this regard, an insert row operation followed by a delete row operation may cancel each other out. Since the first write operation and the second write operation cancel each other out, the first write operation and the second write operation may be removed to reduce the number of write operations in the first transaction. In a further example, the first write operation is an update row operation and the second write operation is a delete row operation following the first write operation, the generated third write operation may be the delete row operation. Because the first write operation may be deleted, the number of write operations in the first decoded transaction is reduced. In a final example, when the first write operation is a delete row operation and the second write operation is an insert row operation, the generated third write operation may be an update row operation. In this regard, the row may already exist, and the row is being deleted then re-added to the table. In a more efficient approach, the delete operation may be removed and the insert row operation may be converted to an update row operation with the values from the second event. In instances where the second event does not include values for certain columns, the third event (i.e. the update row operation) may place null values in the columns that do not include values in the second event.

In block 860, the plurality of events in the first decoded transaction may be updated to reduce the number of write operations by replacing the first decoded event and the second decoded event with the single event. In some embodiments, the number of events may be reduced to the point each event executes on a different row. That is, no two events in the first decoded transaction may write to the same row when committing the first decoded transaction to the second database. To realize this reduction, process 700 and process 800 may be repeated until each event in the reduced number of writer operations writes to a different row. While combining two operations is discussed above, several write operations may be analyzed and combined using the techniques described above. Alternatively, or additionally, process 700 and process 800 may iterate through the plurality of events, and their associated write operations, until only one write operation for each row remains. In these embodiments, a first decoded event and a second decoded event may be merged into a third event; the third event and a fourth decoded event may then be combined to generate a fifth event. The process may be repeated until no two events in the first transaction write to the same row of the same table of the same database. In block 870, the reduced number of events may be written to the second database in parallel. By reducing the number of events such that each event writes to one row, write operations no longer need to be performed in series and row locks may be avoided. This significantly reduces the delays associated with writing transactional data to a database. Furthermore, reducing the number of events in the first transaction such that no two events write to the same row may avoid row locks since there are no more than one operation per row. By avoiding row locks the system may eliminate another source of delays when committing the CDC data to the second database.

In some embodiments, certain events may be combined into a single prepared statement. Prepared statements may appear similar to regular statements, but, use placeholders for the columns and a large number of rows may be passed as a parameter. Prepared statements greatly improve the performance since prepared statements behave similarly to a single statement in regards to parsing and wire protocol handshake. For example, all delete operations that have the same number of primary key columns as there are primary key columns in the table may be combined into a single prepared statement. In another example, insert operations that have the same number of columns as the table may be combined into a single prepared statement. Using prepared statements in this way represents a more efficient technique than performing separate delete or insert operations per row.

Figure 9:
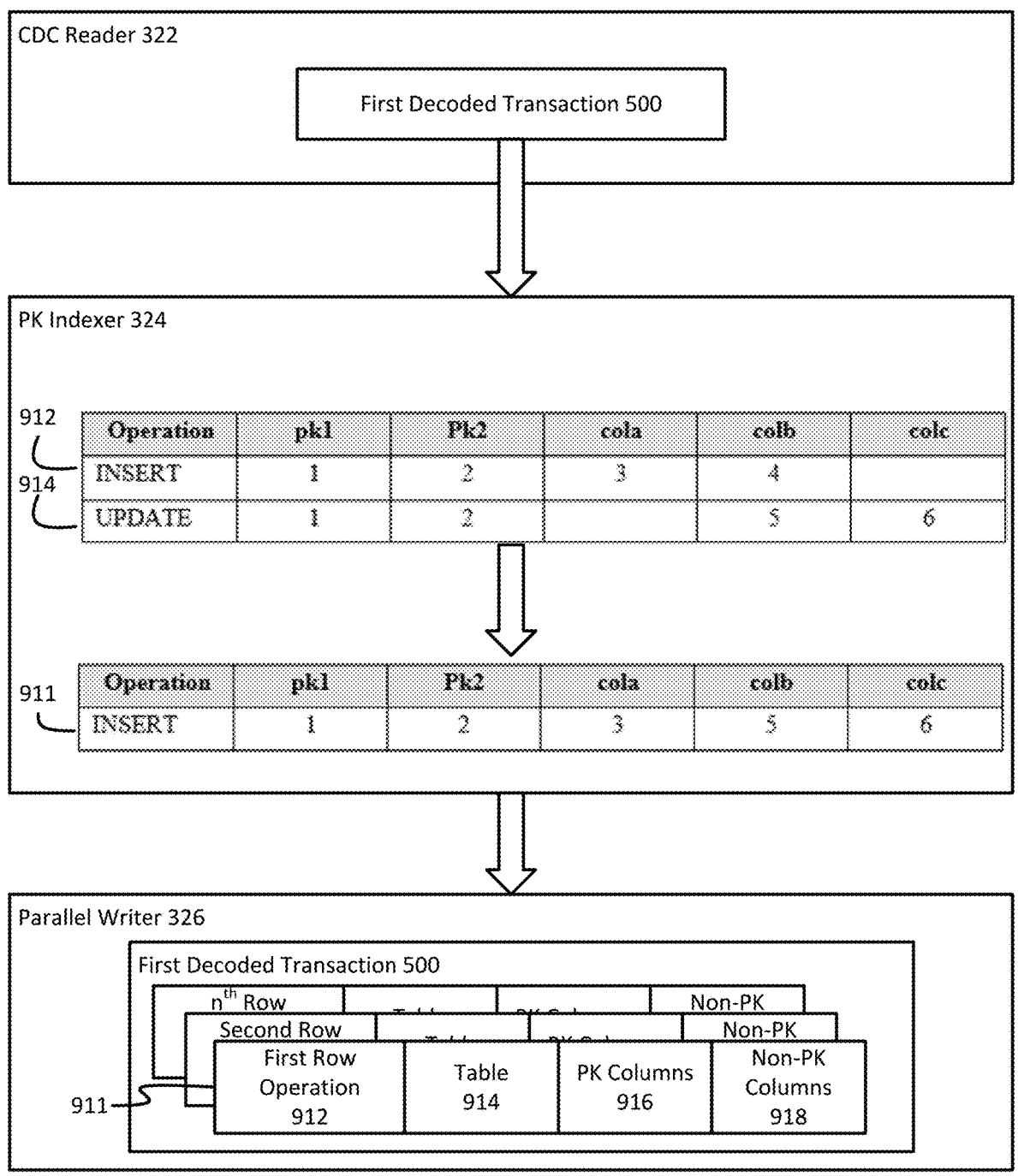
FIG. 9 shows an example of merging a first event and a second event to generate a third event according to one or more aspects of the disclosure.

Turning to FIG. 9, an example of combining a first event 912 and a second event 914 to generate a third event 911 is illustrated. In this regard, PK reducer 324 may receive first decoded transaction 500 from CDC consumer 322. As discussed above, first decoded transaction 500 comprises at least first event 912 and second event 914. After determining that first event 912 and second event 914 may be combined using the techniques described above, PK reducer 324 may analyze first event 912 and second event 914 to determine how the events may be combined. In the example illustrated in FIG. 9, first event 912 may comprise a write operation:

INSERT INTO table (pk1,pk2,cola,colb) VALUES(1,2,3, 4);

First event 912 includes an insert row operation that operates on a table identified as "table." First event 912 includes two primary key columns: pk1 and pk2. The values of pk1 and pk2 are 1 and 2, respectively. Additionally, first event 912 includes two non-primary key columns: cola and colb. The values of cola and colb are 3 and 4, respectively.

Second event 914, which comes after first event 912, may comprise a write operation of the form:

UPDATE table SET colb=5,colc=6 WHERE pk1=1 and pk2=2;

Second event 914 includes an update row operation that operates on a table identified as "table." Second event 914 updates the value of non-primary key column colb with the value of 5 and adds a new non-primary key column, colc, with a value of 6 in rows where the value of pk1 is 1 and the value of pk2 is 2. In analyzing, first event 912 and second event 914, PK reducer 324 may recognize that they write to the same table by both identifying "table." Furthermore, PK reducer 324 may identify that first event 912 and second event 914 write to the same rows, specifically those rows where pk1 is equal to 1 and pk2 is equal to 2. Thus, first event 912 and second event 914 may be combined to generate third event 911 as:

INSERT INTO table (pk1,pk2,cola,colb,colc) VALUES (1,2,3,5,6);

Third event 911 is an insert row operation that writes to the table identified as "table." Like first event 912, third event 911 the values of pk1, pk2, and cola are set to 1, 2, and 3, respectively. However, third event 911 differs from first event 912 by updating the value of colb from 4 to 5 and adds additional non-primary key column colc and sets the value of colc to 6, both of which are defined by second event 914. Thus, first event 912 and second event 914 may be combined to generate functionally equivalent third event 911. PK reducer 324 may update the events in first decoded transaction 500 and pass first decoded transaction 500, with the reduced number of events, to parallel writer 326. Parallel writer 326 may sort the events and write the sorted events to the second database, in parallel. As noted above, this significantly improves the time it takes to write the plurality of transactions to the second database, which allows metrics to be aggregated more quickly and near-real time production of reports.

As noted above, the algorithms and techniques described herein reduce the number of write operations in a first transaction such that no two write operations write to the same row. This allows the reduced number of the plurality of the write operations to be written to the first database in parallel. By writing the plurality of write operations to the first database in parallel, the delays with associated with writing transactional data to a database is significantly reduced. Furthermore, row locks may be avoided because no two write operations write to the same row may avoid row locks since there are no more than one operation per row. By avoiding row locks the system may eliminate another source of committing the first transaction to the first database. Thus, the techniques described herein improve database operations by reducing the amount of time it takes to commit a transaction to a database.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:
receiving, by a first device, a stream of transactions from a first database;
receiving, by the first device, a schema stream, wherein the schema stream identifies a format of data contained in the stream of transactions;
deserializing a plurality of transactions included in the stream of transactions using one or more identifier bindings identified by the schema stream, wherein the plurality of transactions comprises a first encoded transaction;
dividing, by the first device, the first encoded transaction into a plurality of events, wherein the plurality of events comprises a first event and a second event;
associating, by the first device, each of the events in the plurality of events with an event number and an offset value, wherein the first event is associated with a first event number and the offset value and the second event is associated with a second event number and the offset value;

decoding, by the first device, the plurality of events in parallel;

assembling, by the first device, a first decoded transaction by combining the plurality of decoded events according to the associated offset value and the event number associated with each of the plurality of decoded events;

determining, by the first device, whether a first value in a primary key column of the first event is equal to a second value in the primary key column of the second event;

combining the first event and the second event to produce a third event when the first value in the primary key column of the first event is equal to the second value in the primary key column of the second event; and writing, in parallel by the first device, a plurality of reduced events to a second database, wherein the plurality of reduced events comprises replacing the first and second events with the third event.

2. The computer-implemented method of claim 1, wherein the second database is a mirror of the first database.

3. The computer-implemented method of claim 1, comprising:
obtaining, by the first device, a plurality of metrics by querying the second database; and
generating, by the first device, a first report based on the plurality of metrics obtained by querying the second database.

4. The computer-implemented method of claim 1, wherein the third event is functionally equivalent to the first event and the second event.

5. The computer-implemented method of claim 1, comprising:
determining whether the first event and the second event write to a first table prior to determining if the first value in the primary key column of the first event is equal to the second value in the primary key column of the second event.

6. The computer-implemented method of claim 1, wherein the offset value is the same for a plurality of events in the first decoded transaction.

7. The computer-implemented method of claim 1, wherein the stream of transactions from the first database comprises a change data capture (CDC) stream.

8. A apparatus comprising:
a database interface configured to receive a stream of transactions from a first database, receive a schema stream from the first database, and write at least one transaction in the stream of transactions to a second database;
one or more processors; and
memory storing instructions that, when executed by the one or more processors, cause the apparatus to:
deserialize a plurality of transactions included in the stream of transactions using one or more identifier bindings identified by the schema stream, wherein the plurality of transactions comprises a first encoded transaction;
divide the first encoded transaction into a plurality of events, wherein the plurality of events comprises a first event and a second event;
associate the first event with an offset value and a first event number;
associate the second event with the offset value and a second event number;
decode the plurality of events in parallel;
assemble a first decoded transaction by combining the plurality of decoded events according to the associated offset value and the event number associated with each of the plurality of decoded events;
determine whether a first value in a primary key column of the first event is equal to a second value in the primary key column of the second event;
combining the first event and the second event into a third event when the first value is equal to the second value; and
write, via the database interface, a plurality of reduced events of the first transaction to the second database, wherein the plurality of reduced events comprises replacing the first and second events in the first transaction with the third event.

9. The apparatus of claim 8, wherein the second database is a mirror of the first database.

10. The apparatus of claim 8, wherein the instructions cause the apparatus to:
obtain a plurality of metrics by querying the second database; and
generate a first report based on the plurality of metrics obtained by querying the second database.

11. The apparatus of claim 8, wherein the third event is functionally equivalent to the first event and the second event.

12. The apparatus of claim 8, wherein the instructions cause the apparatus to:
determine whether the first event and the second event write to a first table prior to determining whether the first value and the second value are equal.

13. The apparatus of claim 8, wherein the offset value is the same for a plurality of events in the first decoded transaction.

14. The apparatus of claim 8, wherein the stream of transactions from the first database comprises a change data capture (CDC) stream.

15. One or more non-transitory media storing instructions that, when executed by one or more processors, cause the one or more processors to perform steps comprising:
receiving a stream of transactions from a first database;
receiving a schema stream, wherein the schema stream identifies a format of data contained in the stream of transactions;
deserializing a plurality of transactions included in the stream of transactions using one or more identifier bindings identified by the schema stream, wherein the plurality of transactions comprises a first encoded transaction;
dividing the first encoded transaction into a plurality of events, wherein the plurality of events comprises a first event and a second event;
associating each of the events in the plurality of events with an event number and an offset value, wherein the first event is associated with a first event number and the offset value and the second event is associated with a second event number and the offset value;
decoding the plurality of events in parallel;
assembling a first decoded transaction by combining the plurality of decoded events according to the associated offset value and the event number associated with each of the plurality of decoded events;
determining whether a first value in the primary key column of the first event is equal to a second value in the primary key column of the second event;
combining the first event and the second event into a third event when the first value in the primary key column of the first event is equal to the second value in the primary key column of the second event; and writing, in parallel, a plurality of reduced events to a second database, wherein the plurality of reduced events comprises replacing the first and second events in the first transaction with the third event.

16. The one or more non-transitory media of claim 15, wherein the second database is a mirror of the first database.

17. The one or more non-transitory media of claim 15, wherein the instructions, when executed by the one or more processors, cause the one or more processors to perform steps comprising:

obtaining a plurality of metrics by querying the second database; and generating a first report based on the plurality of metrics obtained by querying the second database.

18. The one or more non-transitory media of claim 15, wherein the instructions, when executed by the one or more processors, cause the one or more processors to perform steps comprising:

determining whether the first event and the second event write to a first table prior to determining if the first value in the primary key column of the first event is equal to the second value in the primary key column of the second event.

19. The one or more non-transitory media of claim 15, wherein the offset value is the same for the plurality of events in the first decoded transaction.

20. The one or more non-transitory media of claim 15, wherein the stream of transactions from the first database comprises a change data capture (CDC) stream.

\* \* \* \* \*